(12) United States Patent  
Sanada et al.

(10) Patent No.: US 7,590,198 B2
(45) Date of Patent: Sep. 15, 2009

(54) IMPULSE-BASED COMMUNICATION SYSTEM

(75) Inventors: Yukitoshi Sanada, Yokohama (JP); Jun Furukawa, Chiba (JP)

(73) Assignee: Semiconductor Technology Academic Research Center, Yokohama (JP)

( * ) Notice: Subject to any disclaimer, the term of this patent is extended or adjusted under 35 U.S.C. 154(b) by 686 days.

(21) Appl. No.: 11/130,228

(22) Filed: May 17, 2005

(65) Prior Publication Data

US 2006/0018369 A1   Jan. 26, 2006

(30) Foreign Application Priority Data

Jul. 23, 2004   (JP) .............................. 2004-215861

(51) Int. Cl.
 *H03D 1/00* (2006.01)
(52) U.S. Cl. ..................... 375/343; 375/239; 370/350; 370/503
(58) Field of Classification Search ......... 375/137–139, 375/149, 359–362, 364, 368, 377, 343, 239, 375/350, 503
See application file for complete search history.

(56) References Cited

U.S. PATENT DOCUMENTS 6,763,057 B1 * 7/2004 Fullerton et al. ............. 375/141
2003/0108133 A1 * 6/2003 Richards ...................... 375/351

FOREIGN PATENT DOCUMENTS

JP   2003-379800   11/2003

OTHER PUBLICATIONS

M. Z. Win, R. A. Scholtz, "Ultra-Wide Bandwidth Time-Hopping Spread-Spectrum Impulse Radio for Wireless Multiple-Access Communications" IEEE Trans. On Commun., vol. 48, No. 4, pp. 679-691, Apr. 2000.
K. Siwiak, P. Withington, S. Phelan, "Ultra-Wide Band Radio: The Emergence of an Important New Technology," Vehicular Technology Conference, VTC 2001 Spring, IEEE VTS 53rd, vol. 2, pp. 1169-1172, May 2001.
Roger L. Peterson, Roger L. Ziemer, David E. Borth, "Introduction to Spread Spectrum Communications," Chapter 5, "Initial Synchronization of the Receiver Spreading Code," Prentice Hall, 1995.
Kazimierz Siwiak, "Ultra-Wide Band Radio: Introducing a New Technology," Vehicular Technology Conference, VTC 2001, Spring, IEEE VTS 53rd, vol. 2, 6-9, pp. 1088-1093, May 2001.
Fernando Ramirez-Mireles, "On the Performance of Ultra-Wide-Band Signal in Gaussian Noise and Dense Multipath," IEEE Trans. on Vehicular Technology, vol. 50, No. 1, pp. 244-249, Jan. 2001.
Jack K. Holmes, "Acquisition Time Performance of PN Spread-Spectrum Systems," IEEE Trans. Commun., COM-25, 8, pp. 778-783 (Aug. 1977).

* cited by examiner

*Primary Examiner*—Shuwang Liu
*Assistant Examiner*—James M Perez
(74) *Attorney, Agent, or Firm*—Staas & Halsey LLP

(57) ABSTRACT

A synchronization acquisition method for impulse-based communication including synchronizing received information with a first pulse signal having the same period as the transmit information transmitted from the transmitting end. When the correlation between the received information and an unmodulated second pulse signal exceeds a predetermined threshold, the correlation value is stored together with the reception time in memory. The stored values are sequentially updated, wherein synchronization between the received signal and the first pulse signal is established by determining the generation timing of the first pulse signal by using the time stored in the memory.

18 Claims, 9 Drawing Sheets

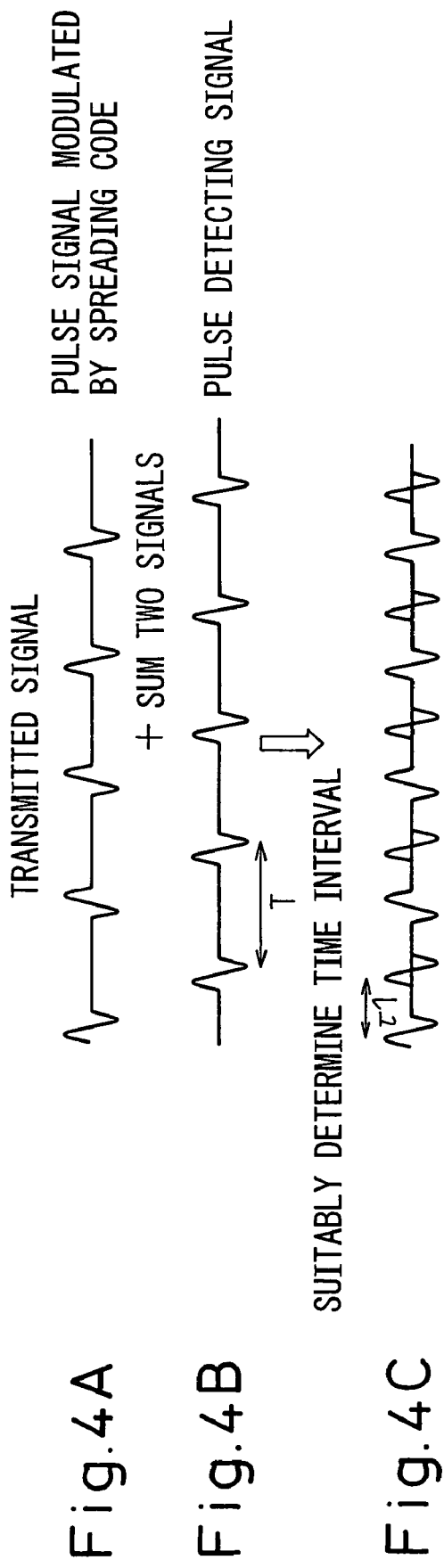

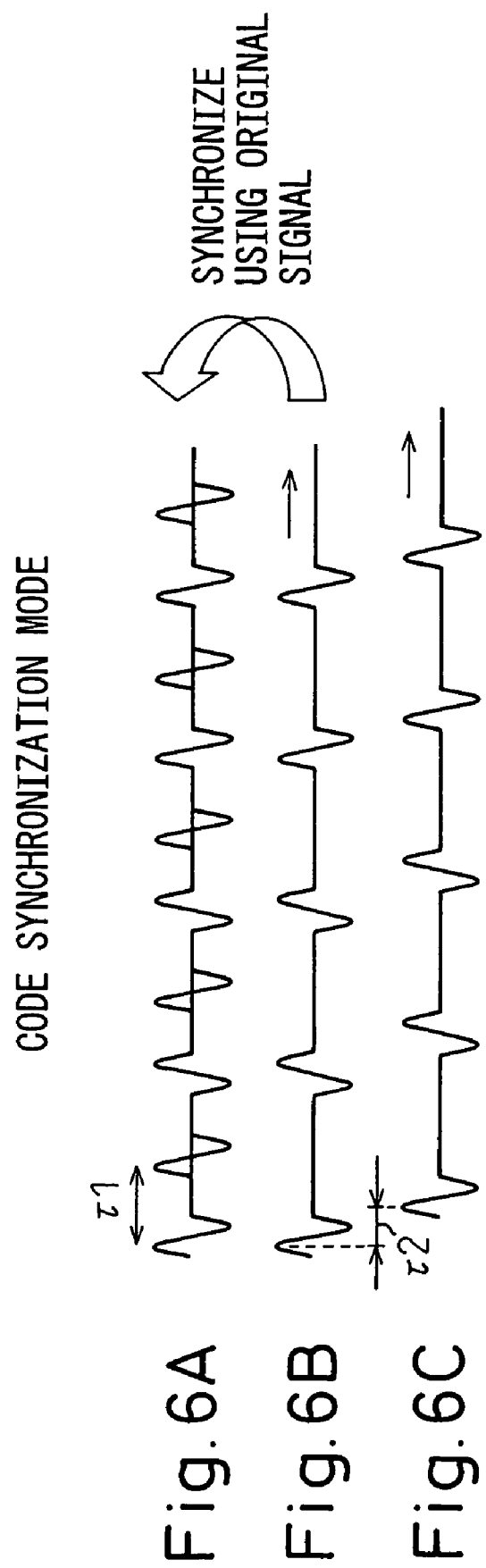

IMPULSE-BASED COMMUNICATION SYSTEM

BACKGROUND OF THE INVENTION

1. Field of the Invention

The present invention relates to an impulse-based communication system and, more particularly, to a synchronization acquisition method for an impulse-based communication system such as a UWB (Ultra Wide Band) system.

2. Description of the Related Art

UWB systems are systems that transmit and receive signals in the form of pulses, without using a carrier, and were approved in 2002 by the FCC for commercial use. According to the definition by the FCC, UWB is "any radio signal that occupies a bandwidth equal to or greater than 20% of the center frequency or that occupies a bandwidth equal to or greater than 500 MHz." UWB has been attracting considerable attention as technology that can achieve high-speed data communications. UWB has the advantage of being able to share the spectrum with other communication systems because UWB signals are transmitted using a very wide bandwidth and at low power. Further, as signals are transmitted as pulses, problems associated with the effects of multipath and fading can also be solved (refer to Non-Patent Documents 1 and 2).

Short-pulse UWB waveforms are used for indoor communications because the effects of multipath interference can be avoided. In the description hereinafter given, an additive white Gaussian noise AWGN model free from multipath is assumed. As described in Non-Patent Document 5, a monocycle waveform w(t) is given by the following equation (1).

$$w(t) = \left\{1 - 4\pi\left(\frac{t}{\tau_m}\right)^2\right\}\exp\left\{-2\pi\left(\frac{t}{\tau_m}\right)^2\right\} \quad (1)$$

where τm is the magnitude of the pulse width.

FIG. 9 is a diagram showing one example of the waveform of a transmit signal modulated by DS (Direct Sequence). In the example shown, one bit of information is represented by S successive pulses (S is a positive integer) in a pulse train of period $T_f$. Other than the DS shown in FIG. 9 which involves pulse phase reversal, TH-UWB (Time-Hopping UWB) is known for use as the modulation scheme.

FIG. 10 is a diagram for explaining the DS-UWB modulation scheme. As shown, in DS-UWB the phase of each pulse in the pulse train is reversed to represent a 0 or a 1. This is similar to the BPSK (Binary Phase Shift Keying) technique employed in traditional CDMA, etc. in which the phase of the carrier is not reversed or reversed to represent information 1 or 0.

FIG. 11 is a diagram for explaining the TH-UWB modulation scheme. As shown, in TH-UWB the position of each pulse on the time axis is changed, for example, by 125 picoseconds, and a 0 or a 1 is represented by the position thus changed.

In either modulation scheme, one bit of information is represented by spectrum spreading with S successive pulses (S is a positive integer) (PN code or Baker code) as earlier described.

In UWB systems employing the DS modulation or TH modulation, code synchronization is an important issue. In many cases, synchronization acquisition must be performed in an environment where the SN ratio is very low or in the presence of interfering waves.

For spread spectrum communications performed by UWB systems employing DS modulation or TH modulation, the prior art provides two synchronization acquisition methods, a matched-filter-based synchronization acquisition method and a correlator-based synchronization acquisition method.

The matched-filter-based synchronization acquisition method can achieve quick synchronization acquisition, but requires a large amount of hardware.

On the other hand, the correlator-based synchronization acquisition method can be implemented using relatively simple hardware, but requires a longer time to achieve synchronization acquisition.

To reduce the synchronization acquisition time, a synchronization acquisition method using a plurality of correlators is proposed, but this method adds complexity to the receiver design and increases power consumption.

In one conventional initial synchronization method that uses the correlation method, the phase state is sequentially changed from one possible state to another until the correct code phase is obtained. Each phase is evaluated for correctness by applying despreading to the received signal and checking the result. If the estimated code phase is correct, despreading is performed and a correlation peak value is detected. If the estimated code phase is not correct, despreading is not performed and the reference signal steps to a new phase for the next estimation. This technique is called the serial search (refer to Non-Patent Document 3).

However, this correlator-based serial search method has the problem that, as the period that contains no information, in the transmitted signal, becomes longer, it takes a longer time to achieve synchronization acquisition at the receiving end.

In view of the above prior art problem, and to reduce the synchronization acquisition time required at the receiving end, the applicant of the present invention proposed a novel synchronization acquisition method in Japanese Patent Application No. 2003-379800 filed on Nov. 10, 2003. In this synchronization acquisition method, which is proposed for impulse-based communication, a pulse detecting signal shifted in phase by a predetermined amount of time with respect to the transmit information of a pulse signal having a prescribed period is generated at the receiving end as well as at the transmitting end, and synchronization is established at the receiving end by using this pulse detecting signal; then, code synchronization is established by shifting the phase by the predetermined amount of time with respect to the synchronized pulse detecting signal.

According to the above prior art, the synchronization acquisition time can be reduced, because synchronization acquisition can be achieved quickly at the receiving end even when no transmit information is contained in the transmitted signal.

However, the above prior art has had the problem that, in an environment where multipath is likely to occur along the propagation path, the pulse detecting signal also becomes complex at the receiving end because of the effects of multipath and it becomes necessary to repeat the synchronization acquisition, thus making the synchronization acquisition time correspondingly longer. There has also been the problem that, after the code synchronization is established, if a pulse detecting signal having a greater electric field strength is detected in a multipath environment, the synchronization acquisition has to be performed once again by suspending the demodulation operation and switching to the pulse detection operation. These problems will be described in further detail with reference to FIGS. 12A and 12B.

FIG. 12A shows one transmitted pulse, and FIG. 12B shows the received signal made complex due to the effects of multipath when the transmitted signal show in part FIG. 12A was received. To acquire synchronization for such a signal, the prior art has had to perform the synchronization acquisition operation repeatedly, because it is not known which peak in the received signal corresponds to the peak of the original signal and it thus becomes difficult to receive the original signal with reduced noise. Further, each time a better peak is detected after establishing the code synchronization, the synchronization has had to be acquired once again by suspending the demodulation operation temporarily and switching to the synchronization establishing operation performed using the pulse detecting signal. Following documents are prior arts of the present invention.

1. Japanese Patent Application No. 2003-379800
2. M. Z. Win, R. A. Scholtz, "Ultra-Wide Bandwidth Time-Hopping Spread-Spectrum Impulse Radio for Wireless Multiple-Access Communications" IEEE Trans. On Commun., vol. 48, no. 4, April 2002
3. K. Siwiak, P. Withington, S. Phelan, "Ultra-Wide Band Radio: The Emergence of an Important RF Technology," Vehicular Technology Conference, VTC 2001 Spring, IEEE VTS 53rd, Vol. 2, pp. 1169-1172, May 2001
4. Roger L. Peterson, Roger L. Ziemer, David E. Borth, "Introduction to Spread Spectrum Communications" Prentice Hall, 1995
5. Kazimierz Siwiak, "Ultra-Wide Band Radio: Introducing a New Technology," Vehicular Technology Conference, VTC 2001 Spring, IEEE VTS 53rd, Volume; 2, 6-9 May 2001
6. Femando Ramirez-Mireles, "On the Performance of Ultra-Wide-Band Signal in Gaussian Noise and Dense Multipath," IEEE Trans. on Vehicular Technology, vol. 50, no. 1, January 2001
7. Jack K. Holmes, "Acquisition Time Performance of PN Spread-Spectrum Systems," IEEE Trans. Commun., COM-25, 8, pp. 778-783 (August 1977)

SUMMARY OF THE INVENTION

It is an object of the present invention to provide a correlator-based synchronization acquisition method for impulse-based communication, such as UWB communication, wherein demodulation and synchronization acquisition are performed in parallel with each other at the receiving end, thereby eliminating the need to repeat the synchronization acquisition even in a multipath environment, and also eliminating the need to suspend the demodulation and perform the synchronization acquisition once again even when a pulse detecting signal having a greater electric field strength is detected during the process of establishing code synchronization.

To achieve the above object, according to a first aspect of the present invention, there is provided a receiver circuit for performing impulse-based communication, comprising: a code synchronizing correlator which synchronizes received information with a first pulse signal that has the same period as a pulse signal modulated by a spreading code and sent from a transmitting end and that is modulated by the same spreading code as the spreading code used at the transmitting end; and a timing detecting correlator which synchronizes the received information with an unmodulated second pulse signal that has the same period as the first pulse signal but is shifted in time with respect to the first pulse signal by an amount equal to the time difference between the spreading code modulated pulse signal sent from the transmitting end and a timing detecting signal sent from the transmitting end, wherein: the timing detecting correlator measures correlation between the received signal and the second pulse signal at predetermined intervals of time that is longer than pulse spacing in the second pulse signal, the timing detecting correlator having a memory for storing a better correlation value together with reception time thereof; and generation timing of the first pulse signal is determined by using the time difference and the reception time, while generation timing of the second pulse signal is determined by using the reception time, thus operating the timing detecting correlator in parallel with despreading being performed by the code synchronizing correlator.

According to a second aspect of the present invention, there is provided a transmitting/receiving system, for performing impulse-based communication, comprising: a transmitter circuit which comprises a first pulse generator which generates transmit information as a pulse signal having a prescribed period, a second pulse generator which generates a pulse detecting signal with the prescribed period, a control circuit which controls the first pulse generator and the second pulse generator so that the time difference between the pulses output from the first and second pulse generators becomes equal to a predetermined value, and an adder which adds the output of the first pulse generator to the output of the second pulse generator and outputs the resulting sum; and the receiver circuit provided by the first aspect of the invention.

According to a third aspect of the present invention, there is provided a synchronization acquisition method, for performing impulse-based communication, comprising: generating, at a receiving end as well as at a transmitting end, a pulse detecting signal shifted in time by a predetermined amount with respect to transmit information of a pulse signal having a prescribed period; establishing synchronization at the receiving end by using synchronization between the received transmit information and the pulse detecting signal; and establishing synchronization between the received signal and the transmit information by generating the transmit information at the receiving end in such a manner as to be shifted in time by the predetermined amount with respect to the synchronized pulse detecting signal, wherein: the received information is synchronized with a first pulse signal that has the same period as the pulse signal modulated by a spreading code and sent from the transmitting end and that is modulated by the same spreading code as the spreading code used at the transmitting end; the received information is synchronized with an unmodulated second pulse signal that has the same period as the first pulse signal but is shifted in time with respect to the first pulse signal by an amount equal to the time difference between the spreading code modulated pulse signal sent from the transmitting end and a timing detecting signal sent from the transmitting end; when synchronizing the received information with the unmodulated second pulse signal, correlation between the received signal and the second pulse signal is measured at predetermined intervals of time, and a better correlation value and generation time thereof are paired together and stored in a memory; and generation timing of the first pulse signal is determined by using the time difference and the reception time, while generation timing of the second pulse signal is determined by using the reception time, thus operating a timing detecting correlator in parallel with demodulation being performed by a code synchronizing correlator, and thereby establishing synchronization between the received signal and the first pulse signal.

In a correlator-based synchronization acquisition method for impulse-based communication, such as UWB communication, synchronization acquisition is performed in parallel with demodulation at the receiving end; this not only makes it easier to receive the original signal even in a multipath environment, but also eliminates the need to suspend demodulation and perform the synchronization acquisition once again even when a pulse detecting signal having a larger peak arrives in a multipath environment.

BRIEF DESCRIPTION OF THE DRAWINGS

FIGS. 4A-4C are diagrams showing output signals from the transmitter circuit shown in FIG. 1;

FIGS. 6A-6C are diagrams for explaining a code detection mode according to the embodiment of the present invention;

DESCRIPTION OF THE PREFERRED EMBODIMENTS

Figure 1:
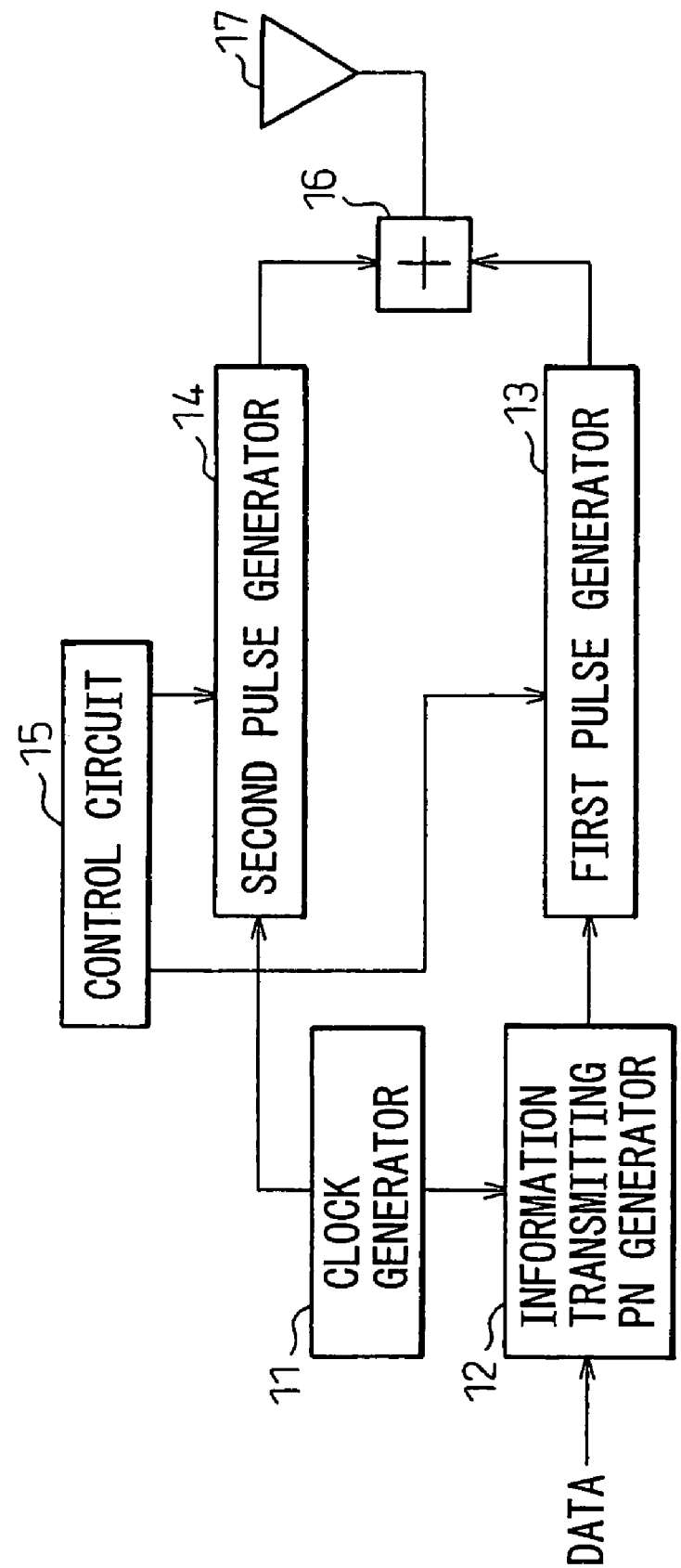
FIG. 1 is a block diagram showing the configuration of a UWB transmitter circuit according to one embodiment of the present invention.

FIG. 1 is a block diagram showing the configuration of a UWB transmitter circuit used in the present invention. In the figure, reference numeral 11 is a clock generator which generates a pulse, for example, every 100 ns, 12 is an information transmitting PN generator which, based on transmit data and the output of the clock generator 11, generates an information transmitting PN (pseudo-noise) signal intended to improve S/N and anti-interference characteristics, 13 is a first pulse generator which, based on the output of the information transmitting PN generator 12, generates pulses of a UWB signal modulated by a spreading code (PN code or Baker code), 14 is a second pulse generator which, based on the output of the clock generator 11, generates a pulse detecting signal at prescribed intervals of time, for example, 100 ns, 15 is a control circuit which controls the first and second pulse generators 13 and 14, 16 is an adder which adds together the outputs of the first and second pulse generators 13 and 14, and 17 is an antenna which transmits the output of the adder 16. In the embodiment of the present invention, the transmitter circuit shown in FIG. 1 performs packet communications. The control circuit 15 controls the first and second pulse generators 13 and 14 so that the pulse output from the second pulse generator 14 at the head of the packet is delayed in phase by a predetermined time τ1 with respect to the phase of the PN-code modulated pulse signal output from the first pulse generator.

With the provision of the second pulse generator 14, as the pulse of prescribed period is output from the second pulse generator 14 at the head of the packet regardless of whether the information transmitting PN generator 12 is generating information or not, synchronization acquisition can be achieved quickly at the receiving end by receiving the pulse from the second pulse generator 14, even in the absence of the information transmitting spreading code.

Figure 2:
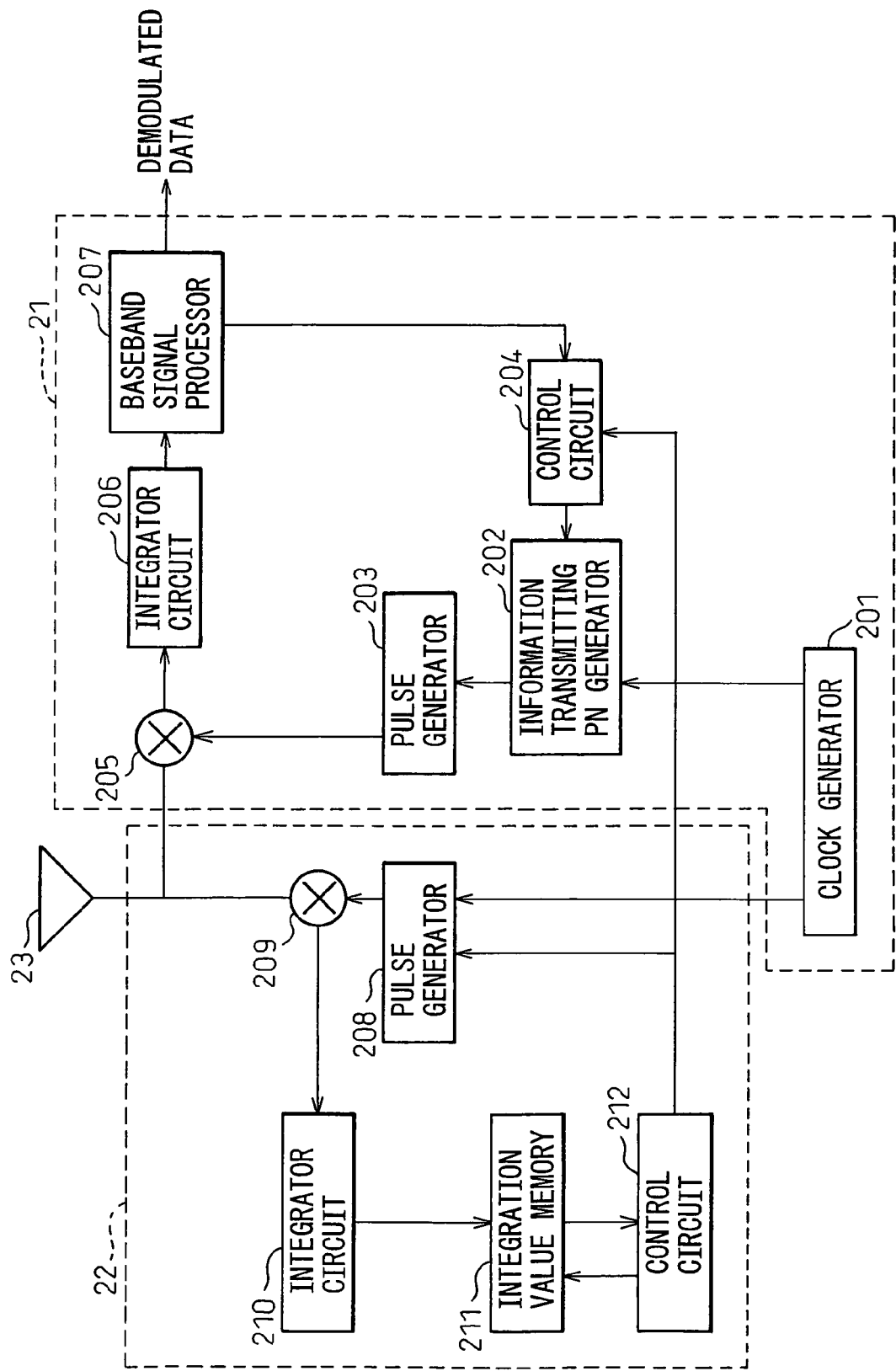
FIG. 2 is a block diagram showing the configuration of a UWB receiver circuit according to one embodiment of the present invention.

FIG. 2 is a block diagram showing the configuration of a UWB receiver circuit according to one embodiment of the present invention. In the figure, reference numeral 21 is a code synchronizing correlator which synchronizes the received information with a first pulse signal that has the same period as the transmit information transmitted from the transmitting end and that is modulated by the same spreading code as the spreading code used at the transmitting end, 22 is a timing detecting correlator, and 23 is a receiving antenna.

The code synchronizing correlator 21 comprises: a clock generator 201 which generates a clock signal having the same period as the clock signal generated by the clock generator 11 in the transmitter circuit; an information transmitting PN generator 202 which generates the same spreading code as the spreading code used at the transmitting end in order to reproduce the baseband signal from the received signal in response to the clock signal output from the clock signal generator 201; a first receiving pulse generator 203 which generates pulses of a UWB signal based on the output of the information transmitting PN generator 202; a first control circuit 204 which controls the generation timing of the output signal of the information transmitting PN generator 202; a first multiplier 205 which multiplies the output of the first pulse generator 203 by the signal received via the receiving antenna 23; an integrator circuit 206 which reproduces information by integrating the output of the first multiplier 205 for every predetermined number of successive PN codes; and a baseband signal processing circuit 207 which recovers the baseband signal from the output of the integrator circuit 206 and outputs it as demodulated data.

The timing detecting correlator 22 comprises: a second pulse generator 208 which, in response to the clock signal output from the clock signal generator 210, generates an unmodulated second pulse signal having the same period as the pulse signal generated by the second pulse generator 14 in the transmitter circuit; a second multiplier 209 which multiplies the received signal by the output of the second pulse generator 208; a second control circuit 212 which performs control so that the time difference between the pulses output from the first and second pulse generators 203 and 208 becomes equal to a predetermined value τ1, and which outputs the reception time τ2 described hereinafter; an integrator circuit 210 which reproduces information by integrating the output of the second multiplier 209 for every predetermined number of successive PN codes; and an integration value memory 211 which, when the correlation value output from the integrator circuit 210 exceeds a predetermined threshold, stores the correlation value together with the reception time τ2 of the correlation value. The second control circuit 212 controls the first controller 204 as well as the timing of the output signal of the second pulse generator 208. When the correlation value output from the integrator circuit 210 exceeds the value stored in the integration value memory 211, the stored value is updated with the new correlation value and, at the same time, the reception time τ2 of the correlation value is also updated. The reception time τ2 defines the time difference between a predetermined reference time and the generation time of the correlation value. The second control circuit 212 is provided with a timer and comparator for implementing these operations.

In response to the output from the second control circuit 212, the first control circuit 204 in the code phase correlator 21 determines the output timing of the information transmitting PN generator based on the time difference τ1 and on the reception time τ2 stored in the integration value memory 211.

In this way, while the code synchronizing correlator 21 is performing an operation, the timing detecting correlator 22 performs an operation to establish synchronization and, when the correlation value output from the integrator circuit 210 at predetermined intervals of time exceeds the previous correlation value, the reception time τ2 stored in the integration value memory 211 is updated with the generation time of the larger correlation value, and the generation timing of the first pulse signal in the code synchronizing correlator 21 is adjusted by using the updated reception time τ2.

Figure 3:
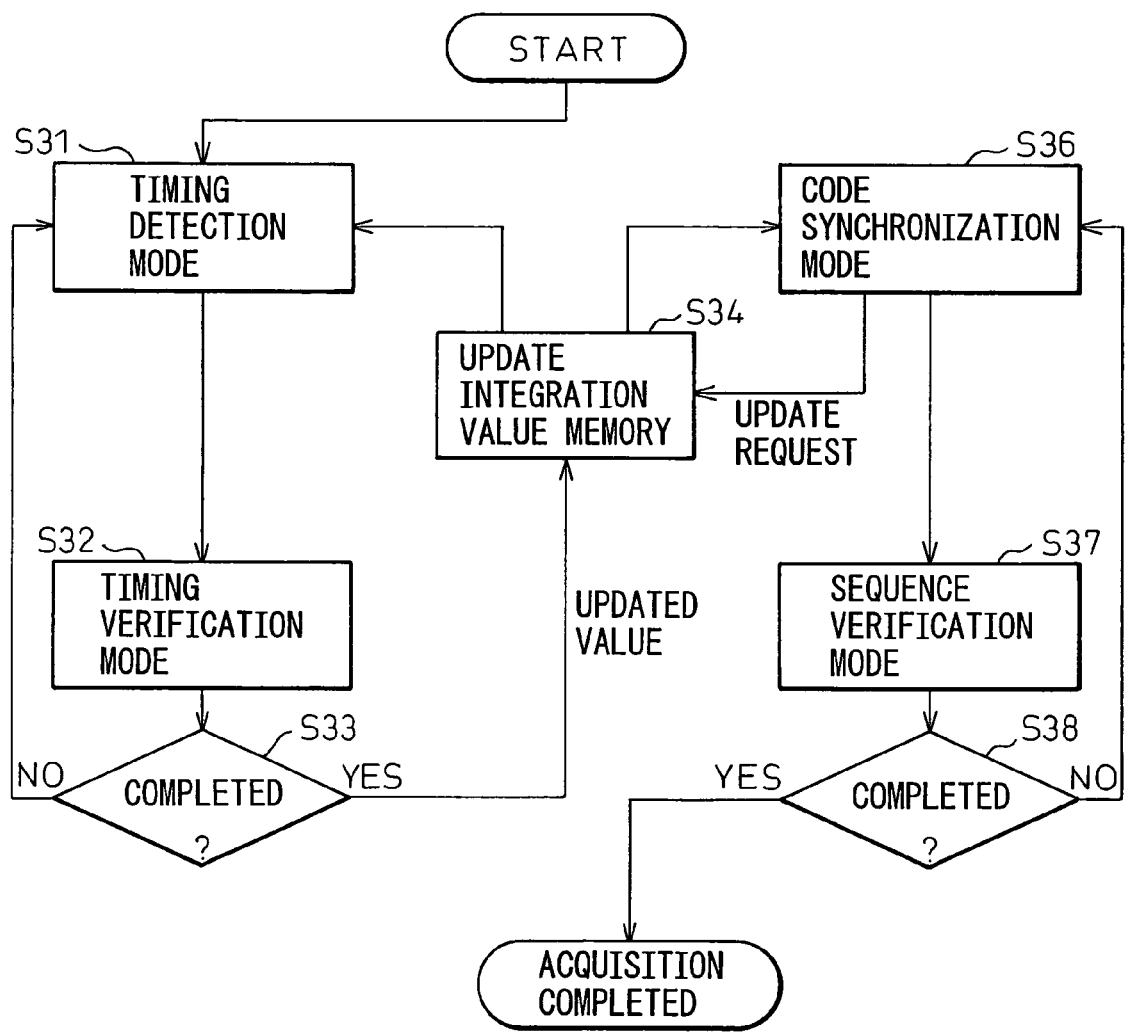
FIG. 3 is a flowchart for explaining the operation of the UWB receiver circuit according to the one embodiment of the present invention shown in FIG. 2.

FIG. 3 is a flowchart for explaining the operation of the UWB communication system according to the embodiment of the present invention shown in FIGS. 1 and 2, FIGS. 4A-4C are diagrams showing output signals from the transmitter circuit shown in FIG. 1, FIGS. 5A-5C are diagrams for explaining phase synchronization in a timing detection mode according to the embodiment of the present invention, and FIGS. 6A-6C are diagrams for explaining phase synchronization in a code detection mode according to the embodiment of the present invention. A synchronization acquisition method according to the embodiment of the present invention will be described with reference to FIGS. 3 to 6A-6C.

First, a signal produced by superimposing the output of the first pulse generator 13 on the output of the second pulse generator 14 is transmitted via the antenna 17 from the transmitter circuit shown in FIG. 1.

FIG. 4A shows the PN-code (spreading-code) modulated pulse signal output from the first pulse generator 13, FIG. 4B shows the output signal of the second pulse generator 14, and FIG. 4C shows the sum of the two signals, i.e., the output of the adder 16. As shown in FIG. 4A, the spreading code is a pulse train of prescribed period T. In each pulse train, bit information is represented by a combination of a pulse with normal phase and a pulse with reversed phase. When there is no transmit information, there are no pulses in the spreading code. Further, as shown in FIG. 4B, the output signal of the second pulse generator 14 is a pulse detecting signal consisting of a pulse train of prescribed period. Here, the time interval τ1 between the output phase of the first pulse generator 13 and the output phase of the second pulse generator 14 is suitably determined in advance, as shown in FIG. 4C.

Figures 5A, 5B, 5C:
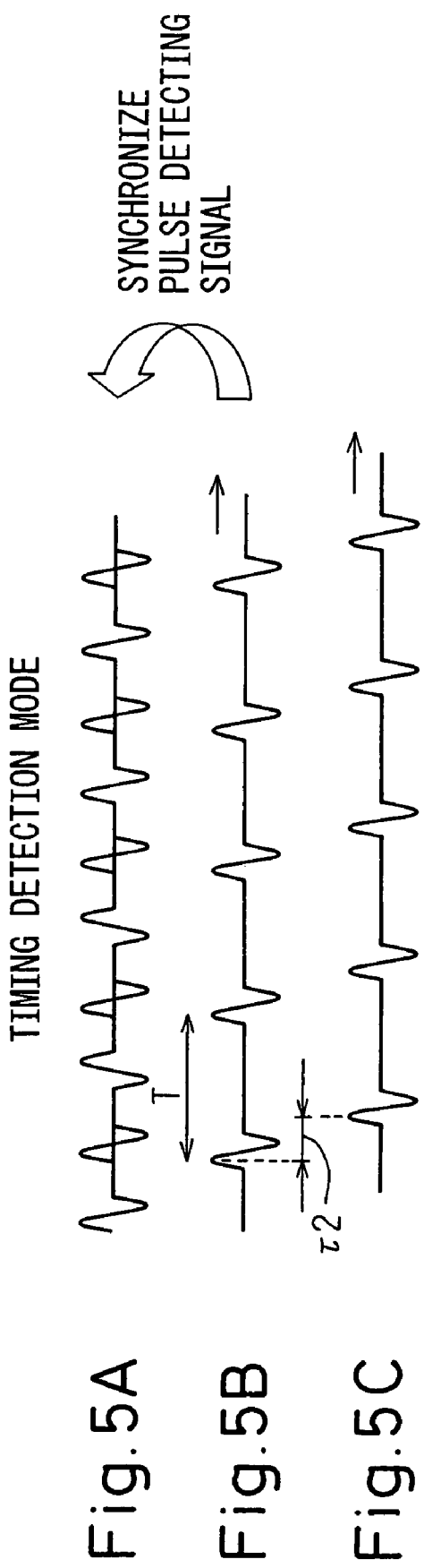
FIGS. 5A-5C are diagrams for explaining a timing detection mode according to the embodiment of the present invention.

In the receiver circuit, in the initial stage of synchronization acquisition the establishment of synchronization is attempted in the timing detection mode of step S31. In the timing detection mode, the multiplier 209 multiplies the received signal (FIG. 5A) by the pulse detecting signal (FIG. 5B) output from the second receiving pulse generator 208. As the pulse detecting signal is a pulse train whose period is constant irrespectively of the presence or absence of the PN code as shown in FIG. 5B, synchronization acquisition can be accomplished during that period T. At this stage, there is no need to consider the phase of the spreading code. When establishing the synchronization, the second control circuit 212 in step S31 tries to find a larger correlation value by shifting the generation timing of the output signal of the second pulse generator 208 by an appropriate time based on the value stored in the integration value memory 211. The appropriate time differs depending on the condition of multipath, and a suboptimal value is determined through simulation. If the time is too long, the time required to establish synchronization becomes longer, but if the time is too short, it becomes difficult to establish synchronization. First, in the timing verification mode of step S32, it is verified whether the correlation value is detected as exceeding the predetermined threshold, and if it is determined in step S33 that the correlation value has been detected as exceeding the predetermined threshold, then in step S34 the time difference between that time and the predetermined reference time (this time difference corresponds to the previously described reception time) τ2 is stored in the integration value memory 211 together with the detected correlation value. If, in step S33, the correlation value is not detected as exceeding the predetermined threshold, the process returns to step S31, where the generation timing of the output signal of the second pulse generator 208 is shifted by the appropriate time, and correlation with the received signal is tested once again.

When the correlation value has been stored in the integration value memory 211 together with the generation time, the stored correlation value is set as the next threshold value, and the process from step S31 to step S33 is repeated; if any correlation value is detected that exceeds the stored correlation value then, in step S34, the new correlation value is stored together with the reception time τ2 to update the previous value.

If the predetermined reference time is taken at a certain phase peak of the pulse detecting signal shown in FIG. 5B, then FIG. 5C shows the pulse detecting signal output from the second pulse generator 208 when a larger correlation value is detected. As shown, the generation timing of the pulse detecting signal of FIG. 5C is delayed by τ2 with respect to the generation timing of the pulse detecting signal of FIG. 5B.

Once the correlation value is stored in the integration value memory 211 together with the reception time τ2, the operation in the above-described timing detection mode proceeds in parallel with the operation in the code synchronization mode described hereinafter.

That is, in the code synchronization mode, in step S36 the time difference τ2 stored in the integration value memory 211 is given to the first control circuit 204. There are two methods to do this: in one method, the first control circuit 204 makes an update request to the second control circuit 212, requesting the delivery of the reception time τ2 stored in the integration value memory 211, and in the other method, the second control circuit 212 forcefully delivers the reception time τ2 stored in the integration value memory 211 to the first control circuit 204.

The first control circuit 204 controls the generation timing of the output signal of the spreading information transmitting PN generator 202 by using the reception time τ2 paired with the correlation value given from the second control circuit 212, the time difference τ1 between the spreading-code modulated pulse signal (FIG. 4A) as the transmitted signal and the pulse detecting signal (FIG. 4(b)), and the output signal of the baseband signal processing circuit 207.

FIG. 6A shows the received signal, FIG. 6B shows the output of the first receiving pulse generator 203, and FIG. 6C shows the output of the first pulse generator 203 whose generation timing is delayed by τ2. As shown, the pulse detecting signal shown in FIG. 6B output from the first pulse generator 203 is delayed by the predetermined time τ1 with respect to the received signal. On the other hand, as the time difference detected in the timing detection mode is τ2, the control circuit 204 performs control so that the first pulse generator 203 outputs a signal whose phase is advanced by τ1+f(τ2) with respect to the phase of the output of the second pulse generator 208 for which synchronization acquisition is already completed; in this way, synchronization acquisition of the spreading code also is quickly accomplished within the period T of the pulse detecting signal. Here, the function f(τ2) is determined by the reference time against which τ2 is measured.

Next, a sequence verification mode is executed in step S37, and it is determined in step S38 whether the synchronization acquisition is completed or not; if the synchronization fails, the process returns to step S36.

As the operation of the timing detecting correlator continues in parallel with the above-described demodulation operation of the code synchronizing correlator, the value stored in the integration value memory 211 is continually updated. In the code synchronization mode, operation for the synchronization acquisition is performed by sequentially using the updated values until the synchronization acquisition is achieved. If the synchronization acquisition fails, the synchronization acquisition can be quickly restored by just sliding the pulse detecting signal at the receiving end at intervals of time equal to the period T of the output of the first pulse generator 203. In this way, not only can needless integration time be eliminated during intervals of no pulses, but synchronization can also be established easily even in an environment where, due to the presence of multipath, it is difficult to discriminate between the original signal and reflections such as noise; furthermore, if the transmitted signal changes, the synchronization acquisition operation need not be repeated, and quick synchronization acquisition can thus be achieved.

Figure 7:
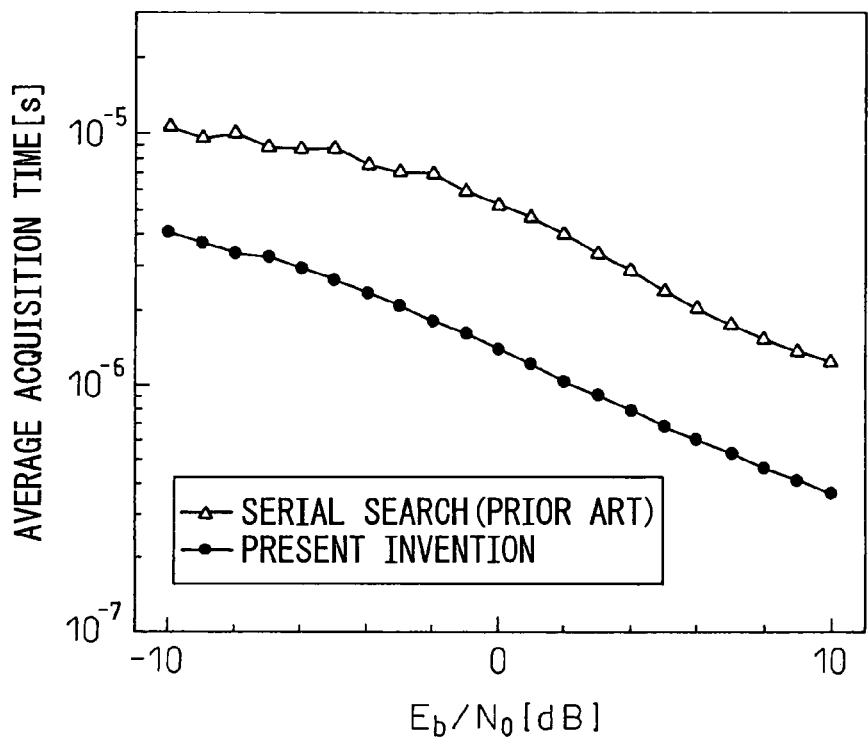
FIG. 7 is a graph showing the synchronization acquisition time versus Eb/No according to the embodiment of the present invention for comparison with the prior art.

FIG. 7 is a graph obtained through an experiment in which the synchronization acquisition time according to the embodiment of the present invention was compared with that of the prior art. As shown, the average synchronization acquisition time in the presence of multipath was much shorter in the present invention than in the prior art serial search, over the range of −10 dB to 10 dB in terms of the electric field strength to noise ratio Eb/No.

Figure 8:
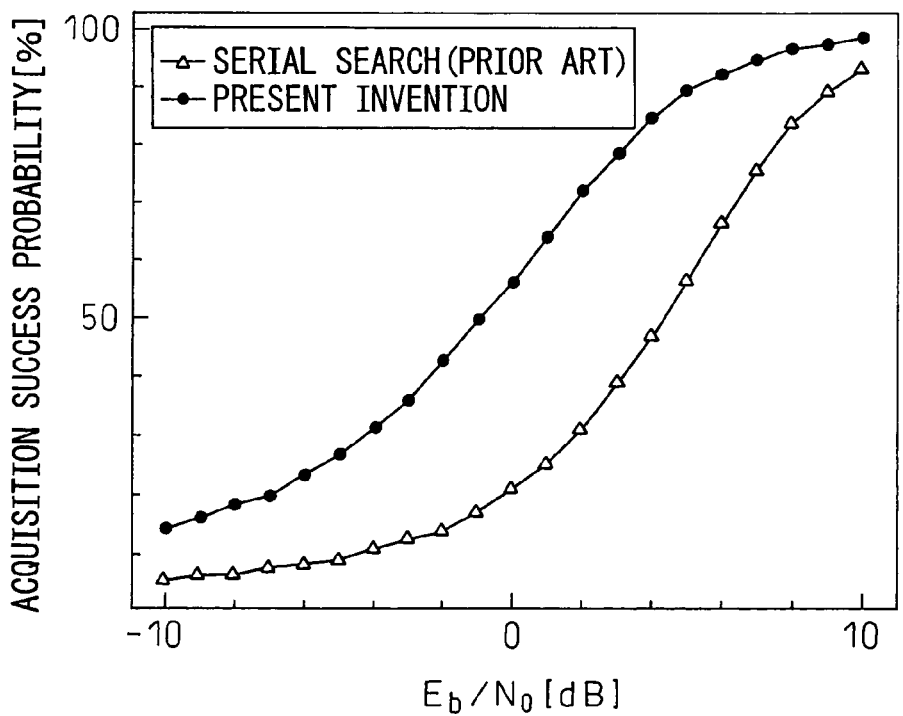
FIG. 8 is a graph showing the success probability of acquisition versus Eb/No according to the embodiment of the present invention.
Figure 9:
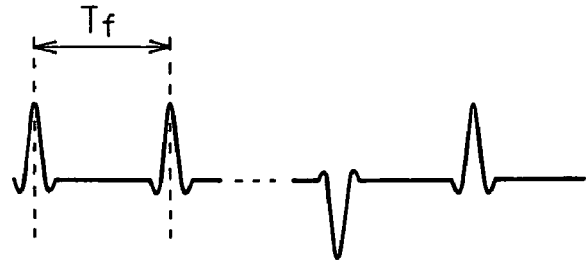
FIG. 9 is a diagram showing one example of the waveform of a transmit signal modulated by DS (Direct Sequence)
Figure 10:
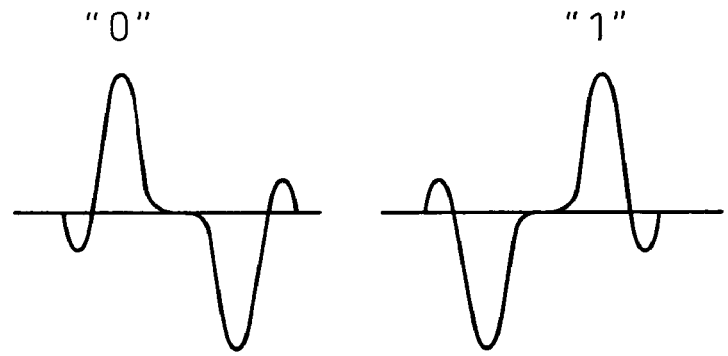
FIG. 10 is a diagram for explaining an example of a waveform modulated by DS-UWB scheme.
Figure 11:
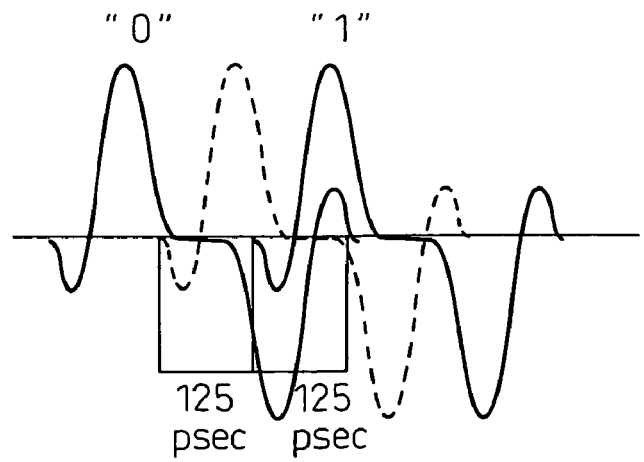
FIG. 11 is a diagram for explaining an example of a waveform modulated by TH-UWB scheme.
Figure 12:
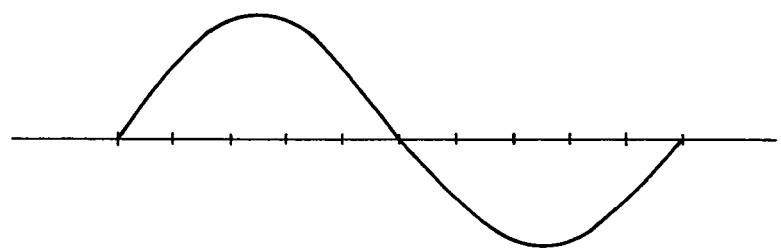
FIGS. 12A and 12B are diagrams for explaining multipath.
Figure 12:
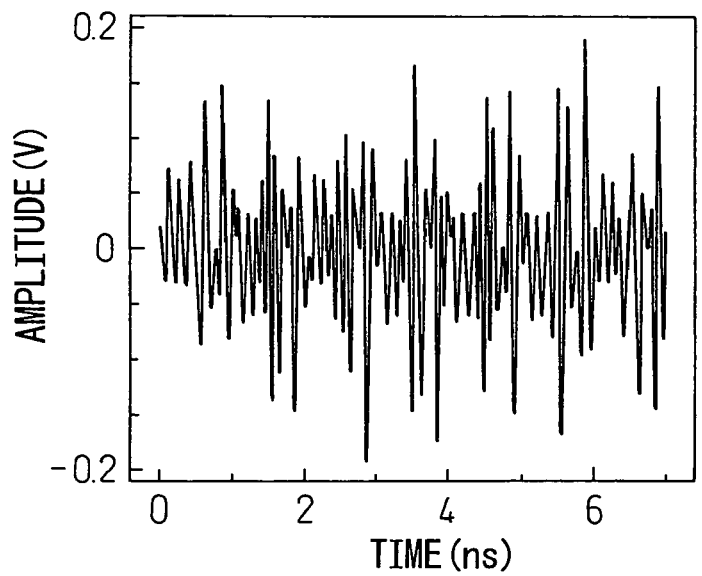

FIG. 8 is a graph obtained through an experiment in which the success probability of synchronization acquisition according to the embodiment of the present invention was compared with that of the prior art. As shown, the acquisition success probability in the presence of multipath was much greater in the present invention than in the prior art serial search, over the range of −10 dB to 10 dB in terms of the electric field strength to noise ratio Eb/No.

The present invention is not limited to the above-described embodiment; for example, DS-UWB has been used as the wireless system, but instead, TH-UWB or TM (Time Modulation) UWB may be used. It will also be noted that the invention is equally applicable to a UWB other than that defined by the FCC. Further, BPSK has been used as the modulation format, but BPAK may be used instead. Furthermore, the present invention is not limited to packet communications, but can be applied to all kinds of impulse-based communications that use synchronizing signals.

As described above, according to the present invention, synchronization acquisition can be quickly and reliably accomplished in impulse-based UWB even in dense multipath environments. Further, if the transmitted signal changes, there is no need to repeat the synchronization acquisition operation. Moreover, according to the present invention, the average synchronization acquisition time can be reduced compared with the prior art. Furthermore, according to the method of the present invention, quick synchronization acquisition and synchronization acquisition with high success probability can be achieved without adding complexity to the hardware.

What is claimed is:

1. A receiver circuit for performing impulse-based communication, comprising:

a code synchronizing correlator which synchronizes received information with a first pulse signal that has a same period as a pulse signal modulated by a spreading code, and sent from a transmitting end, and is modulated by the same spreading code as the spreading code used at the transmitting end; and a timing detecting correlator which synchronizes the received information with a reference second pulse signal, unmodulated by the spreading code, that has the same period as the first pulse signal but is shifted in time with respect to the first pulse signal by an amount equal to a time difference between the spreading code modulated pulse signal sent from the transmitting end and a timing detecting signal sent from the transmitting end, wherein the timing detecting correlator measures correlation between the received information and the second pulse signal at predetermined intervals of time that is longer than pulse spacing in the second pulse signal, the timing detecting correlator having a memory for storing a better correlation value together with reception time thereof, and generation timing of the first pulse signal is determined by using the time difference and the reception time, while generation timing of the second pulse signal is determined by using the reception time, thus operating the timing detecting correlator in parallel with demodulation being performed by the code synchronizing correlator.

2. A receiver circuit as claimed in claim 1, wherein the code synchronizing correlator comprises: a first pulse generator which generates the first pulse signal; a first multiplier which multiplies the received signal by an output of the first pulse generator; demodulating means for recovering demodulated data from an output of the first multiplier; and a first control circuit which controls the generation timing of the first pulse signal based on an output of the demodulating means, the time difference, and the reception time, and the timing detecting correlator comprises: a second pulse generator which generates the second pulse signal; a second multiplier which multiplies the received signal by an output of the second pulse generator; and a second control circuit which performs control so that the generation timing of the pulse to be output from the first pulse generator is shifted by an amount equal to the generation time stored in the memory.

3. A receiver circuit as claimed in claim 1, wherein the impulse-based communication is impulse-based Ultra Wide Band (UWB).

4. A receiver circuit as claimed in claim 1, wherein the transmit information is generated by using an information transmitting spreading code.

5. A receiver circuit as claimed in claim 4, wherein the information transmitting spreading code is an information transmitting pseudo-noise (PN) code.

6. A receiver circuit as claimed in claim 4, wherein the information transmitting spreading code is an information transmitting Baker code.

7. A transmitting/receiving system for performing impulse-based communication, comprising a transmitter circuit and a receiver circuit, wherein the transmitter circuit comprises:

a first pulse generator which generates transmit information as a pulse signal having a prescribed period;

a second pulse generator which generates a pulse detecting signal with the prescribed period;

a control circuit which controls the first pulse generator and the second pulse generator so that a time difference between the pulses output from the first and second pulse generators becomes equal to a predetermined value; and an adder which adds the output of the first pulse generator to the output of the second pulse generator and outputs the resulting sum, and the receiver circuit comprises:

a code synchronizing correlator which synchronizes received information with a first pulse signal that has a same period as a pulse signal modulated by a spreading code and sent from a transmitting end and that is modulated by the same spreading code as the spreading code used at the transmitting end; and a timing detecting correlator which synchronizes the received information with a reference second pulse signal, unmodulated by the spreading code, that has the same period as the first pulse signal but is shifted in time with respect to the first pulse signal by an amount equal to a time difference between the spreading code modulated pulse signal sent from the transmitting end and a timing detecting signal sent from the transmitting end, wherein the timing detecting correlator measures correlation between the received information and the second pulse signal at predetermined intervals of time that is longer than pulse spacing in the second pulse signal, the timing detecting correlator having a memory for storing a better correlation value together with reception time thereof, and generation timing of the first pulse signal is determined by using the time difference and the reception time, while generation timing of the second pulse signal is determined by using the reception time, thus operating the timing detecting correlator in parallel with demodulation being performed by the code synchronizing correlator.

8. A transmitting/receiving system as claimed in claim 7, wherein the impulse-based communication is impulse-based Ultra Wide Band (UWB).

9. A transmitting/receiving system as claimed in claim 7, wherein the transmit information is generated by using an information transmitting spreading code.

10. A transmitting/receiving system as claimed in claim 9, wherein the information transmitting spreading code is an information transmitting pseudo-noise (PN) code.

11. A transmitting/receiving system as claimed in claim 9, wherein the information transmitting spreading code is an information transmitting Baker code.

12. A synchronization acquisition method for performing impulse-based communication, comprising:

generating, at a receiving end as well as at a transmitting end, a pulse detecting signal shifted in time by a predetermined amount with respect to transmit information of a pulse signal having a prescribed period;

establishing synchronization at the receiving end by using synchronization between received transmit information and the receiving end generated pulse detecting signal; and establishing synchronization between the received information and the transmit information by generating transmit information at the receiving end in such a manner as to be shifted in time by the predetermined amount with respect to the synchronized receiving end generated pulse detecting signal, wherein the received information is synchronized with a first pulse signal that has a same period as the pulse signal modulated by a spreading code and sent from the transmitting end and that is modulated by the same spreading code as the spreading code used at the transmitting end, the received information is synchronized with a reference second pulse signal, unmodulated by the spreading code, that has the same period as the first pulse signal but is shifted in time with respect to the first pulse signal by an amount equal to a time difference between the spreading code modulated pulse signal sent from the transmitting end and a timing detecting signal sent from the transmitting end, when synchronizing the received information with the unmodulated second pulse signal, correlation between the received information and the second pulse signal is measured at predetermined intervals of time that is longer than pulse spacing in the second pulse signal, and a better correlation value and reception time thereof are paired together and stored in a memory, and generation timing of the first pulse signal is determined by using the time difference and the reception time, while generation timing of the second pulse signal is determined by using the reception time, thus operating a timing detecting correlator in parallel with demodulation being performed by a code synchronizing correlator, and thereby establishing synchronization between the received signal and the first pulse signal.

13. A synchronization acquisition method as claimed in claim 12, wherein the impulse-based communication is impulse-based Ultra Wide Band (UWB).

14. A synchronization acquisition method as claimed in claim 12, wherein the transmit information is generated by using an information transmitting spreading code.

15. A synchronization acquisition method as claimed in claim 14, wherein the information transmitting spreading code is an information transmitting pseudo-noise (PN) code.

16. A synchronization acquisition method as claimed in claim 14, wherein the information transmitting spreading code is an information transmitting Baker code.

17. A synchronization acquisition method as claimed in claim 12, wherein the transmit information is a Direct Sequence (DS) modulated code comprising a sequence of inverted and non-inverted pulses.

18. A synchronization acquisition method as claimed in claim 12, wherein the transmit information is a Time-Hopping (TH) modulated code in which each pulse phase is shifted or not shifted by a predetermined amount of time.

* * * * *

UNITED STATES PATENT AND TRADEMARK OFFICE
CERTIFICATE OF CORRECTION

PATENT NO. : 7,590,198 B2
APPLICATION NO. : 11/130228
DATED : September 15, 2009
INVENTOR(S) : Sanada et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1011 days.

Signed and Sealed this

Twenty-first Day of September, 2010

David J. Kappos
*Director of the United States Patent and Trademark Office*